US007822150B2

(12) United States Patent
Davis et al.

(10) Patent No.: US 7,822,150 B2
(45) Date of Patent: Oct. 26, 2010

(54) SPHERICAL DECODER FOR WIRELESS COMMUNICATIONS

(75) Inventors: Linda Mary Davis, Cowan (AU); David Garrett, Old Bridge, NJ (US); Bertrand M. Hochwald, Summit, NJ (US); Stephan Ten Brink, Allmersbach (DE)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 2323 days.

(21) Appl. No.: 10/389,690

(22) Filed: Mar. 15, 2003

(65) Prior Publication Data
US 2004/0181419 A1    Sep. 16, 2004

(51) Int. Cl.
*H04L 27/06*    (2006.01)
(52) U.S. Cl. .................................................... 375/340
(58) Field of Classification Search ................. 375/316, 375/340, 341, 346
See application file for complete search history.

(56) References Cited

U.S. PATENT DOCUMENTS

| | | | | |
|---|---|---|---|---|
| 4,761,784 | A * | 8/1988 | Srinivasagopalan et al. | 714/795 |
| 4,933,956 | A * | 6/1990 | Forney, Jr. | 375/341 |
| 5,134,635 | A * | 7/1992 | Hong et al. | 375/341 |
| 5,396,518 | A * | 3/1995 | How | 375/265 |
| 5,457,704 | A * | 10/1995 | Hoeher et al. | 714/794 |
| 5,684,842 | A * | 11/1997 | Daffara | 375/354 |
| 5,867,538 | A * | 2/1999 | Liu | 375/341 |
| 6,115,435 | A * | 9/2000 | Harada et al. | 375/341 |
| 6,243,423 | B1 * | 6/2001 | Sakoda et al. | 375/262 |
| 6,301,317 | B1 | 10/2001 | Ben-Eli | |
| 6,654,928 | B1 * | 11/2003 | Terry et al. | 714/792 |
| 6,944,242 | B2 | 9/2005 | Yakhnich et al. | |
| 6,977,972 | B1 * | 12/2005 | Kandala et al. | 375/332 |
| 7,010,052 | B2 * | 3/2006 | Dill et al. | 375/265 |
| 7,076,000 | B2 * | 7/2006 | Rodriguez | 375/262 |
| 7,079,052 | B2 * | 7/2006 | Lamy et al. | 341/67 |
| 7,106,810 | B2 * | 9/2006 | Collins et al. | 375/316 |
| 7,218,906 | B2 * | 5/2007 | Sayeed et al. | 455/295 |

(Continued)

FOREIGN PATENT DOCUMENTS

EP    1 133 097 A1    9/2001

OTHER PUBLICATIONS

Albert M. Chan "A New Reduced-Complexity Shpere Decoder For Multiple Antenna Systems." IEEE pag 460-464, 2002.*

(Continued)

*Primary Examiner*—Temesghen Ghebretinsae
(74) *Attorney, Agent, or Firm*—Carlson, Gaskey & Olds, P.C.

(57) ABSTRACT

A decoding scheme for determining the information within a coded transmission includes a spherical decoder candidate search that reduces the number of candidate symbol combinations from a much larger number of possibly transmitted combinations. In one example, the spherical decoder uses an upper triangular matrix representation of the channel matrix as part of a recursive, cumulative cost function that provides the results of the candidate search. The candidate search includes considering symbols in a hierarchy or tree structure that represents the possibly transmitted combinations. The cost function incrementally accumulates a cost of a possible combination as the search progresses through the hierarchy. As soon as a symbol is determined to not be a valid candidate, all possible combinations including that symbol are discarded without considering them, directly.

15 Claims, 5 Drawing Sheets

U.S. PATENT DOCUMENTS

| | | | |
|---|---|---|---|
| 7,234,100 B1* | 6/2007 | Sadowsky | 714/792 |
| 7,257,170 B2* | 8/2007 | Love et al. | 375/340 |
| 7,280,622 B2* | 10/2007 | Love et al. | 375/340 |
| 7,283,591 B2* | 10/2007 | Ruehle | 375/253 |
| 7,308,026 B2* | 12/2007 | Purho | 375/233 |
| 7,315,577 B2* | 1/2008 | Shao | 375/260 |
| 7,340,001 B2* | 3/2008 | Smith et al. | 375/261 |
| 7,340,002 B2* | 3/2008 | Choi et al. | 375/262 |
| 7,349,496 B2* | 3/2008 | Jia et al. | 375/341 |
| 7,480,342 B2* | 1/2009 | Wilhelmsson et al. | 375/286 |
| 7,499,505 B2* | 3/2009 | Zogakis | 375/317 |
| 7,512,868 B2* | 3/2009 | Rouxel | 714/794 |
| 2002/0031195 A1* | 3/2002 | Honary | 375/341 |
| 2002/0122510 A1* | 9/2002 | Yakhnich et al. | 375/342 |
| 2002/0131515 A1* | 9/2002 | Rodriguez | 375/262 |
| 2002/0154704 A1* | 10/2002 | Reshef | 375/262 |
| 2002/0196862 A1* | 12/2002 | Dill et al. | 375/265 |
| 2003/0039318 A1* | 2/2003 | Tong et al. | 375/298 |
| 2003/0039321 A1* | 2/2003 | Lee et al. | 375/329 |
| 2003/0067991 A1* | 4/2003 | Okamoto | 375/262 |
| 2003/0167441 A1* | 9/2003 | Huang et al. | 714/792 |
| 2003/0194025 A1* | 10/2003 | Vasquez | 375/341 |
| 2004/0001537 A1* | 1/2004 | Zhang et al. | 375/229 |
| 2004/0001564 A1* | 1/2004 | Chan et al. | 375/341 |
| 2004/0037381 A1* | 2/2004 | Hwang et al. | 375/347 |
| 2004/0042565 A1* | 3/2004 | Garrett | 375/341 |
| 2004/0047438 A1* | 3/2004 | Zhuang et al. | 375/340 |
| 2004/0052317 A1* | 3/2004 | Love et al. | 375/340 |
| 2004/0071229 A1* | 4/2004 | Collins | 375/340 |
| 2004/0184537 A1* | 9/2004 | Geiger et al. | 375/240.11 |
| 2004/0264618 A1* | 12/2004 | Zogakis | 375/371 |
| 2005/0254605 A1* | 11/2005 | Holmes et al. | 375/341 |
| 2006/0140302 A1* | 6/2006 | Jahan et al. | 375/286 |

OTHER PUBLICATIONS

European Search Report dated Jun. 29, 2004.
Vikalo, H., et al.: "Low-Complexity Iterative Detection and Decoding of Multi-Antenna Systems Employing Channel and Space-Time Codes", 2002.
G. David Forney, Jr., "The Viterbi Algorithm", 1973.
U.S. Appl. No. 10/205,760, filed Jul. 26, 2001.

* cited by examiner

SPHERICAL DECODER FOR WIRELESS COMMUNICATIONS

FIELD OF THE INVENTION

This invention generally relates to wireless communication. More particularly, this invention relates to detecting wireless transmissions.

DESCRIPTION OF THE RELATED ART

Wireless communications using cellular networks are widespread and becoming increasingly used. The desire to increase the availability of such communication requires more efficient use of available channels (i.e., frequencies over which wireless information can be transmitted).

Various approaches have been proposed for utilizing multiple antenna transmissions. Wireless transmissions often utilize symbols representing bits of information rather than transmissions of the bits, themselves. Mapping bits into such symbols increases the amount of information (number of bits) that can be transmitted over a channel at one time. Conventional techniques include mapping an encoded bit stream to a sequence of complex-value symbols selected from a constellation that are transmitted as modulations of a carrier wave. The difficulty, however, is presented when higher order bit-per-symbol encoding techniques are used with multiple antennas because a very high number of potential received bit streams become possible.

Example formats for such bit encoding techniques include QPSK, 8-PSK and 16-QAM. With each encoding scheme, the amount of information that can be transmitted at any given time increases with the number of valid constellation points within the symbol. Using QPSK, for example, two bits may be transmitted simultaneously.

Another way at increasing the throughput of wireless communication systems includes utilizing more than one transmit antenna to simultaneously transmit signals over the same channel. High data transfer rates are possible using multiple transmit and multiple receive antennas (e.g., multiple-input, multiple out "MIMO" or BLAST systems). The difficulty, however, is presented when higher order bit-per-symbol encoding techniques are used with multiple antennas because a very high number of potential received bit streams become possible. When multiple antennas are used with QPSK, for example, a number of possible combinations exist. When four transmitting antennas are used, for example, there are 256 possible transmission combinations. The complexity using 8-PSK or 16-QAM increases dramatically. For example, when there are four transmitting antennas using 16-QAM, there are 65,536 different combinations of symbols that can be simultaneously transmitted over the channel. Moreover, the transmission from each antenna is superimposed over the other antenna transmissions.

At the receiver end, the detection technique must efficiently and accurately determine what was transmitted. There must be an accurate channel estimation on each of the propagation paths from the antennas. The channel estimate is then used with sets of received symbols to determine the best estimate of the transmitted vectors. In the case of four transmitting antennas and a 16-QAM encoding technique, it is not practical to do an exhaustive computation of the more than 65,000 possible transmission combinations.

The complex nature of the encoded transmissions combined with the superimposition that occurs when multiple antennas transmit simultaneously over the same channel greatly increases the computational requirements imposed by the use of such codes in a multiple antenna arrangement.

Accordingly, there is a need for an improved technique for decoding transmissions that have information coded in a format that yields a high number of possibly transmitted combinations. This is especially true of systems including multiple transmit antennas. This invention addresses that need.

SUMMARY OF THE INVENTION

In general terms, the present invention pertains to a method of detecting received coded symbols that reduces a number of available symbol combinations to a reduced number of candidates without considering each of the available combinations. The reduced number of candidates may then be used in a selected detection algorithm to determine the received information.

One example of the present invention includes using a cost function that cumulatively assigns a cost to every symbol within a vector. The cost function in one example associates a cost with at least one symbol in an available combination (i.e., vector) that is dependent on a cost associated with at least one other of the symbols in that combination. The available symbols are associated with each other in a hierarchy containing all available combinations such that once a first available symbol is determined not to be a valid part of one of the candidate combinations, all symbols possibly combined with the first symbol from lower or dependent levels in the hierarchy can be discarded as soon as the first symbol is discarded.

One example of the present invention includes recursively and cumulatively incrementing the cost associated with symbols that are linked through the hierarchy into possible combinations as each symbol in a combination is considered moving from a higher level to a lower level in the hierarchy. The incremented cost is compared to a search radius value. Once an available symbol has an associated cost that is greater than the radius value, it is discarded (i.e., not included in the set of candidates) along with all symbols possibly combined with it from lower, dependent levels in the hierarchy.

One exemplary implementation of the present invention includes using a triangular matrix representation of the channel matrix to determine a cost associated with a considered available candidate.

The inventive approach includes a candidate search that is capable of quickly obtaining a number of candidate symbol combinations that may be approximately 1 percent of the number of available symbol combinations without directly considering most of the 99%, which are not likely candidates. This represents a substantial advantage and improvement over prior decoding schemes, which relied upon evaluating all available candidates.

The various features and advantages of this invention will become apparent to those skilled in the art from the following detailed description of the currently preferred embodiment. The drawings that accompany the detailed description can be briefly described as follows.

DETAILED DESCRIPTION

Figure 1:
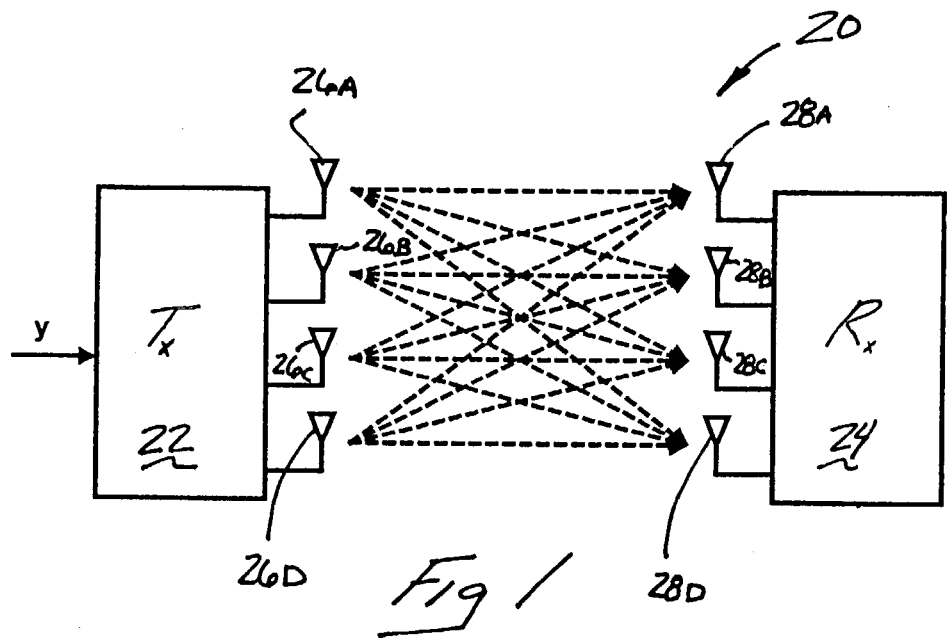
FIG. 1 schematically illustrates an example system for transmitting coded information having a receiver that includes a spherical decoder designed according to this invention.

FIG. 1 diagrammatically illustrates a wireless communication system 20. A transmitter portion 22 communicates over wireless communication channels with a receiver portion 24. In one example, the transmitter portion 22 is a base station in a cellular communication network. The receiver portion 24 may take a variety of forms. Example receivers that are useful in a system designed according to this invention includes cell phones, laptop computers, personal digital assistants and devices that combine the features of one or more of these. Of course, this invention is not limited to any particular transmitter or receiver device.

As schematically shown in FIG. 1, the transmitter portion 22 has the ability to transmit signals over a plurality of antennas 26. In one example, each antenna simultaneously transmits over the same channel frequency. The receiver portion 24 in this example includes a plurality of receiving antennas. This particular example has four transmitting antennas 26A-D and four receiving antennas 28A-D. As known, multiple transmit antennas and multiple receive antennas provide a multiple input, multiple output (MIMO) system. This invention is well suited for use in MIMO systems but is not limited to such systems. MIMO examples are discussed to demonstrate the capacity for the inventive approach to effectively decode received information.

When four antennas simultaneously transmit signals over the same channel, the channel can be represented by a channel matrix. The channel matrix is an N×M matrix where M is the number of transmitting antennas 26 and N is the number of receiving antennas 28. The channel matrix is made up of complex fading coefficients indicating the different streams simultaneously transmitted by the antennas 26 and received by the antennas 28.

One exemplary detection process useful in a system designed of the present invention includes using the channel matrix as part of a cost function for determining or detecting the content of the received transmissions. In one example implementation of this invention, a maximum likelihood a posteriori probability algorithm (MLAPP) is used as part of the detection scheme, which includes a cost function for determining the content of the transmitted information. In one example, each candidate (i.e., potentially received set of symbols) is multiplied by the channel matrix to provide an indication of what is received by the receiver when the transmission from the antennas 26 include that candidate. In other words, the product of the candidate multiplied by the channel matrix provides expected received vectors. The MLAPP algorithm includes comparing that product to what should be received by the receiving antennas 28, assuming that candidate was transmitted. The difference between that product and what should be received provides the cost function value, which indicates whether the candidate is the most likely transmitted symbol.

This present invention may include the ability to use such an approach even in situations where multiple transmitting antennas simultaneously transmit different streams. Because it is not feasible to exhaustively look at all available combinations of potentially transmitted symbols, this invention includes using a spherical decoder to provide an initial estimation of the candidates most likely to be contained in the transmitted information, which are then the only ones processed using the MLAPP algorithm (or another selected detection technique). This spherical decoder initial estimate is referred to as a "continuous ML estimate" in this description.

The candidate search quickly reduces the number of available and potentially transmitted candidates to a manageable level without considering each of the available symbols. The candidate search uses a relationship between the candidates associated with each antenna to determine a cost function value on a cumulative basis. The candidate search takes advantage of a hierarchical relationship or tree structure of the candidate symbol combinations. The candidate search cost function is set such that a determination of the cost associated with a candidate at one level in the tree structure provides the ability to determine whether all other candidates in dependent branches can be eliminated.

According to one example, the cost function value of a selected candidate is compared to a search radius that is selected to yield a desired number of remaining candidates when the search is complete. Whenever a cost of a candidate is outside of the search radius, that candidate and all others in dependent branches of the tree structure are eliminated from the list of potential candidates.

The cost function in one example is formulated into a positive definite summation over the transmit antennas and uses the search radius to prune out large sections of the search space tree.

One exemplary implementation of the present invention may include using a transformation of the channel matrix as part of the search cost function that reduces the number of candidates in a manner that makes the cost (i.e., the cost function value) associated with a selected candidate dependent on the cost associated with a previously considered candidate linked with the selected candidate in the tree structure (i.e., at a higher level in a considered combination). In this sense, the candidate search includes a recursive approach that allows for eliminating a significant number of the candidates based upon the cost function determination regarding a previously considered candidate. In one example, the candidate search utilizes a recursive cost function that is based upon the difference between that which is received at the receiving antennas 28 and the product of a candidate multiplied by the transformed channel matrix.

Using the illustrated four transmitting antenna configuration of FIG. 1 with 16-QAM encoding, for example, the fourth antenna 26A is considered using the recursive cost function to determine which of the candidate symbols were most likely transmitted using the antenna 26A. For each candidate that does not satisfy the cost function (i.e., the cost function value is too high), all candidates associated with the antennas 26C, 26B and 26A that depend upon that candidate value for the antenna 26D can be eliminated without being specifically considered. Additionally, many available symbols potentially transmitted by antenna 26D can be discarded without considering them, directly.

Figure 2:
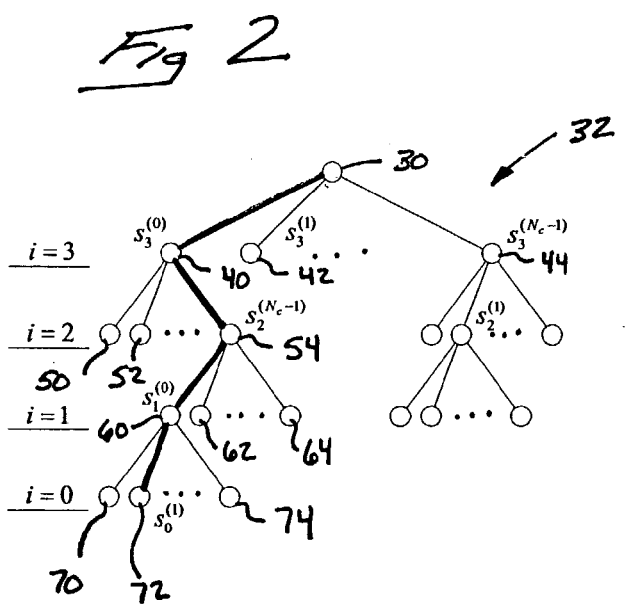
FIG. 2 schematically illustrates a hierarchy that represents a plurality of available symbol combinations and an example method of performing a candidate search on such a hierarchy.

Referring to FIG. 2, an example candidate search is illustrated, which begins at a node 30. A portion of an example tree structure hierarchy 32 represents available combinations of possibly transmitted symbols. In a situation including four transmit antennas and 16QAM, the hierarchy has 16 nodes associated with each antenna and 16 child nodes from each of those at each level. In this example, the candidate search begins at a high level of the hierarchy 32 and proceeds down to lower levels until the cost function limiting value is reached. Once the cost function value associated with a candidate at a node exceeds the limit, that candidate and all others in dependent nodes (i.e., all child nodes) are discarded as they are not valid candidates. The search then moves back up one level and continues.

For example, the search beginning at the node 30, which corresponds to a candidate transmitted by the antenna 26D for example, proceeds to the next lower level (i=3) where the cost function value associated with the candidate symbol at node 40 is determined. In this example, the cost function value of the candidate at the node 30 (in this case the cost function value for node 30 is zero because it is the root of the tree) is added to that of the candidate at node 40. That value is still within the cost function limit (i.e., search radius).

The search continues down to node 50, where the corresponding candidate symbol has a cost function value (including that associated with the candidate at node 40) outside of the acceptable limit. At that point, the candidate 50 and all available combinations including that candidate are discarded as not valid candidates for later decoding. The same is true at the node 52.

The candidates at nodes 54, 60 and 72 cumulatively have a cost function value within the limit so that combination or vector from node 30 to node 40 to node 54 to node 60 to node 72 is forwarded on for decoding as a valid candidate. A valid candidate is only considered once the algorithm has reached the bottom level of the search tree.

Each of the candidates at nodes 42, 44, 62, 64, 70 and 74 are determined to have a cost function value that exceeds the acceptable limit so that they are discarded. Every possible combination including the candidate at node 42, for example is eliminated as soon as the cost function value of that candidate was determined to be outside of the acceptable range without considering any of the combinations including that candidate.

Accordingly, this invention allows for quickly reducing the number of potential candidates to a manageable level that allows for the decoding processing (using an MLAPP algorithm, for example) to proceed at an acceptable pace. In one example, the initial candidate search reduction of possible candidates results in remaining candidates for decoding processing on the order of about 1% of the total number of available symbol combinations. In one example, the candidate search yields about 500 candidates. This is a significant reduction compared to the more than 65,000 different combinations possible in a configuration having four transmit antennas 26 and a 16-QAM encoding scheme.

In one example, which is described in the following paragraphs, the channel matrix is transformed into an upper triangular matrix. Using a triangular matrix (upper or lower) as part of the candidate search cost function is one exemplary way of providing the recursive nature of the cost function such that a determination regarding a selected candidate for one antenna has the potential for eliminating all other candidates on dependent branches based upon the cost function value for that candidate.

One major assumption for this example that the channel is flat fading and the channel coefficients have a single complex representation. This may require a space-time equalizer at the front-end of the receiver 24 to remove any of the frequency selective fading along with a noise whitening filter to compensate for the correlated noise out of the equalizer. Another option is to use orthogonal frequency division multiplexing (OFDM) to make each channel look flat. Additionally, the noise in the APP detector is assumed to be white.

A transmitted signal y can be represented by the equation $$y=Hs+n \tag{1}$$

For this example, let $P_c=2^{Q_c}$ be the number of points per constellation symbol, e.g. $Q_c=4$, $P_c=16$ for 16-QAM. The following variables define equation (1): $s=(\underline{s}_0, \ldots, \underline{s}_{M-1})$ transmitted M×1 vector of constellation symbols, entries chosen from some complex constellation (e.g. QPSK); carries $M \cdot Q_c$ bits;

$H=(\underline{h}_{ij})$ N×M channel matrix of complex fading coefficients;

n N×1 noise vector, entries complex Gaussian random variables;

y received N×1 vector channel symbol, (i.e. channel observations).

It should be noted that underlined scalar variables are complex and all vectors/matrices have complex entries.

Linear preprocessing includes computing a triangular M×M matrix, as the triangular form of the channel matrix. In one example the triangular matrix representation of the channel matrix is an upper triangular matrix $U=(\underline{u}_{ij})$, with real diagonal entries $u_{ii}$, such that $U^H U = H^H H$, where $(.)^H$ denotes a complex conjugate transpose. In another example, $L=(\underline{l}_{ij})$ is a lower triangular matrix, with real diagonal entries, $l_{ii}$, such that $LL^H = H^H H$. In principle, the triangular matrix can be based either on a Cholesky or a QR decomposition, and there are several known methods that can be used to determine it. The present invention may include a way of obtaining a triangular matrix representation of the channel matrix H that is described in more detail below.

The maximum likelihood (ML) search for the best candidate in one example involves solving the cost function for all possible transmit candidates and selecting the candidate with the lowest overall cost. In the system where the complexity is too high to search exhaustively, it is important to search a targeted subset of candidates that have the highest chance of yielding the minimum cost solution. An important step in implementing the example spherical candidate search algorithm is to formulate the cost function so that it depends on the triangular matrix (U for example) and a search center point, ŝ. Once a search center point has been selected, the cost function for the ML search can be reformulated (in the upper triangular case) as:

$$J=|y-Hs|^2=(s-\hat{s})^H U^H U(s-\hat{s})+C \tag{2}$$

The constant, C, depends only on H and ŝ, and therefore is constant for all possible different candidates, s. In the case of the candidate search, only the relative distribution of values matters, and not the absolute value of J.

The upper triangular matrix, U, is used to formulate equation (2) into a summation of terms over each transmit antenna. This provides the recursive, fast-reducing capability of the example candidate search spherical algorithm. The summation shown below in equation (3) creates a cost function that is guaranteed to be positive definite. Each term in the summation will always increase the value of the cost function. Therefore, if in the calculation of the total cost function over each transmit antenna the cost value exceeds a predetermined constraint, there is no reason to continue to compute the additional terms because they will only make the total cost higher. The balance in the spherical algorithm is to set this cost threshold or search radius appropriately so that the search continues along a reasonable number of paths, while eliminating many of the branches in the search space that do not lead to the ML solution.

The first term from equation (2) can be arranged in a summation over the upper triangular matrix U. The summation is over the number of transmit antennas, $0 \leq i < M$. The spherical algorithm picks a radius r, which allows only a short list of candidates to solve the inequality in equation (3). Once the radius has been selected, candidates which violate the inequality can be excluded from the search. The key to rapidly pruning the search tree is to identify candidates that already violate the search radius with the first few terms in the inequality, without evaluating all the possible candidates.

$$(s-\hat{s})^H U^H U(s-\hat{s}) = \sum_{i=M-1}^{0} \left| u_{ii} \cdot (\underline{s}_i - \hat{\underline{s}}_i) + \sum_{j=i+1}^{M-1} u_{ij} \cdot (\underline{s}_j - \hat{\underline{s}}_j) \right|^2 \leq r^2 \quad (3)$$

with search radius r.

Given this description, those skilled in the art will be able to select an appropriate value for the search radius to meet the needs of their particular situation. For example, the search radius can be set to yield as few candidates as possible to reduce the search time. At the same time, however, setting the radius too small yields less soft information that is used in a conventional manner to determine the accuracy or reliability of the decoding scheme. Another option is to continually shrink the search radius to each valid candidate found. This will minimize the search time to find the constrained ML solution, but will limit the number of additional candidates needed to generate soft information. Those skilled in the art who have the benefit of this description will be able to balance such competing considerations and arrive at a useful search radius to satisfy given requirements.

The sum can be formulated recursively ("cumulative path metric"), with respective terms for antenna i being denoted a $T_{outer}$, as shown in the equation:

$$T_{outer,i} = T_{outer,i+1} + |u_{ii}(\underline{s}_i - \hat{\underline{s}}_i) + \underline{T}_{inner,i}|^2 \leq r^2 \quad (4)$$

$$\underline{T}_{inner,i} = \sum_{j=i+1}^{M-1} u_{ij} \cdot (\underline{s}_j - \hat{\underline{s}}_j)$$

The term $|u_{ii} \cdot (\underline{s}_i - \hat{\underline{s}}_i) + \underline{T}_{inner,i}|^2$ can be regarded as a metric increment, based on the choice of the hypothesis on constellation symbol $\underline{s}_i$ of transmit antenna i.

The recursive equation for the candidate search spherical cost function can be regarded as a tree-search over a subset of vector constellation symbols whereby search tree branch pruning is performed based on the search radius constraint. The first level of the tree represents the last transmit antenna of the system, and there are $P_c$ combinations of candidates to evaluate. Each possible candidate has $P_c$ further branches under it, until reaching the final candidate at the tree level i=0.

Referring to FIG. 2, the search starts at the root 30 of the tree 32 and branches off with hypotheses on constellation symbol $\underline{s}_{M-1}$ (stemming from transmit antenna M-1), corresponding to level i-1. Each node in the tree uses the previous transmit candidates used to reach that node in order to calculate the $T_{inner}$ component (Equation 4) of the cost metric, and then tests each of the $P_c$ hypotheses for the current level. If the cost function value associated with any of the candidates exceeds the search radius, then the search does not have to continue down the tree.

The higher in the tree that a node can be eliminated significantly reduces the search space. For example, eliminating nodes at level i of the tree prunes $2^{(MQ-iM)}$ candidates (for 4×4 16-QAM, 4096 nodes can be removed by pruning nodes at i=3, 256 and 16 for i=2 and i=1, respectively). The search continues through all paths through the tree that are within the search radius constraint. Once a valid constellation vector $s=(\underline{s}_0, \ldots, \underline{s}_{M-1})$ has been found (e.g. see thick lines in FIG. 2 showing the vector represented by the search path from node 30 to node 40 to node 54 to node 60 ending at node 72), it is pushed onto the APP queue, to be included in the APP post processing stage (reduced complexity ML-APP).

The search tree 32 can be partitioned into tree sections. A tree section is composed of a parent node and $P_c$ child nodes, representing the $P_c$ possible constellation symbols. The operations within a tree section can be done in parallel. Thus, it is advantageous to perform the tree search using a tree section search engine, also referred to as a "stack searcher." An example stack searcher architecture is schematically shown in FIGS. 3-5.

Figure 3:
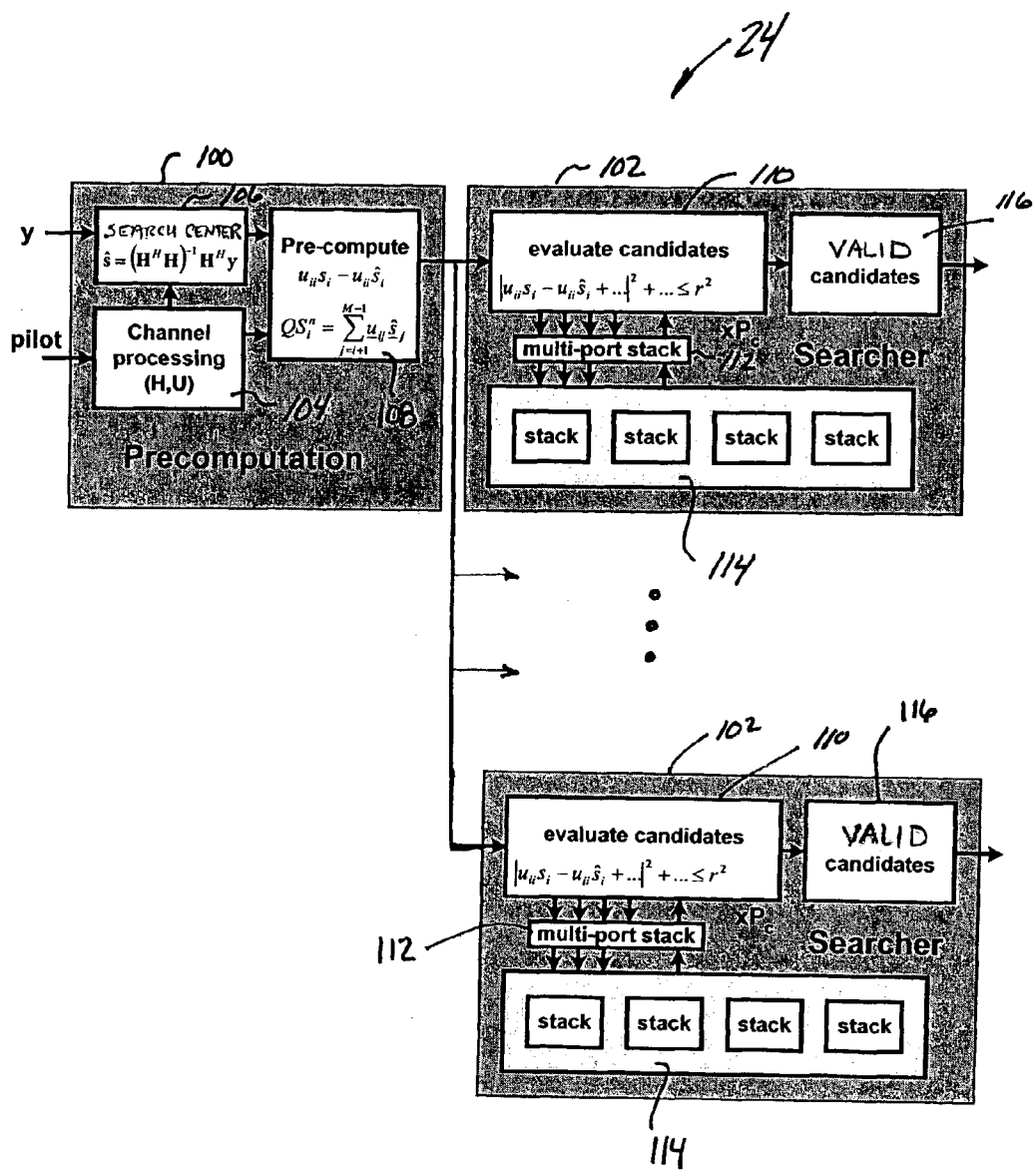
FIG. 3 schematically illustrates an example architecture of selected portions of a receiver having a spherical decoder designed according to this invention.
Figure 4:
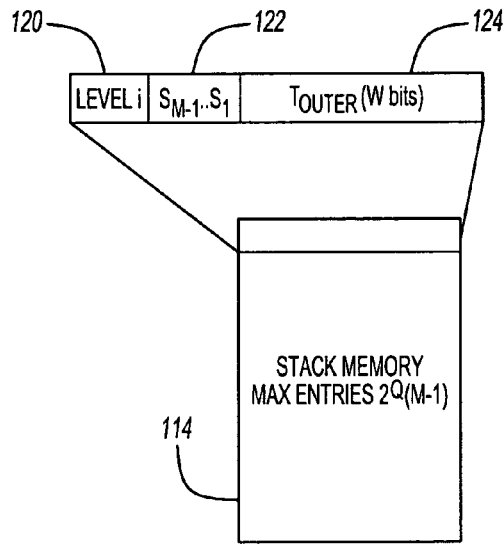
FIG. 4 schematically illustrates an example memory format useful with the embodiment of FIG. 3.
Figure 5:
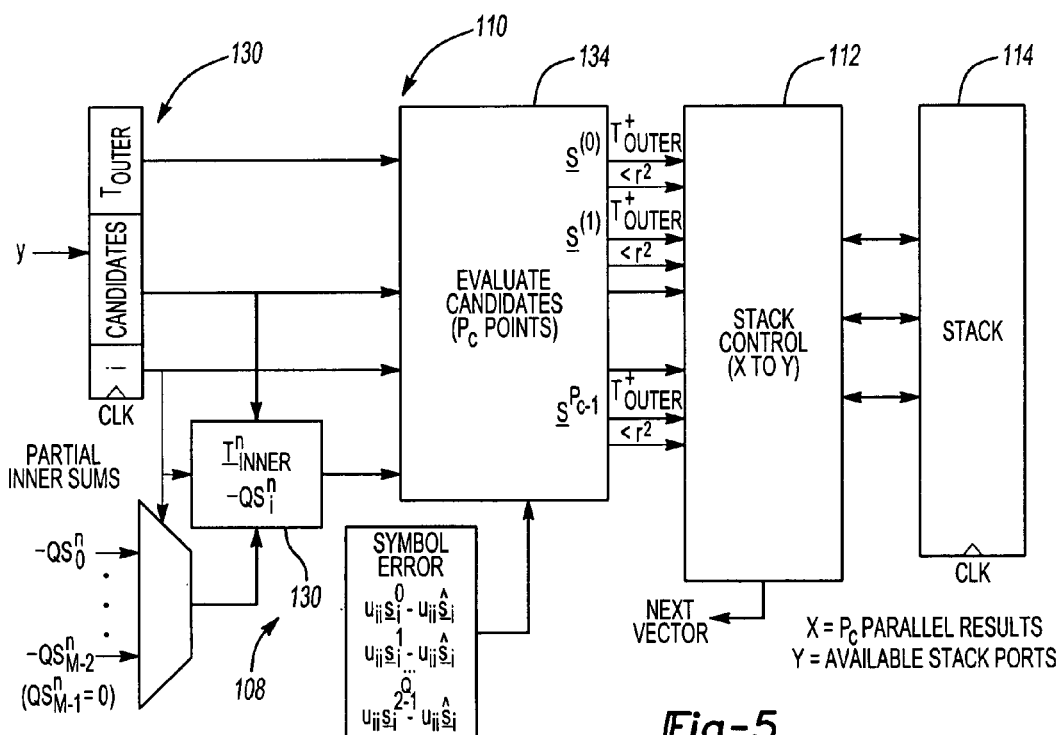
FIG. 5, schematically illustrates selected portions of the embodiment of FIG. 3 in somewhat more detail.

Referring to FIGS. 3 and 5, selected portions of the receiver 24 are schematically shown including a precomputation unit 100 and a searcher unit 102. The precomputation unit utilizes the signals y and the pilot signals transmitted from the antennas 26. A channel processing module determines the channel matrix H (Equation 1) and the upper triangular matrix U. A search center determining module 106 determines ŝ. A precomputation module determines values of $T_{inner}$ (Equation 11) and symbol error values.

The output from the precomputation unit is provided to the searcher unit 102 where a candidate search module 110 applies the cost function to the available symbols in a recursive, cumulative manner as described above. A multi-port stack 112 facilitates storing the cost function values associated with each candidate considered by the candidate search module 110. A stack memory 114 at least temporarily contains the cost function values along with sufficient identifier information for the values within the stack memory 114 to be used by the candidate search module as it progresses through the hierarchy representing the available combinations of transmitted symbols. The candidates that are determined to be within the search radius r of the candidate search are placed into the valid candidates queue 116 so that they can be decoded using a selected decoding scheme such as an MLAPP.

The precomputation unit 100 monitors the incoming channel and calculates the upper triangular matrix U from the channel matrix H. The matrix U only has to be calculated when the channel matrix changes, therefore it is constant for a large block of incoming symbols. Because the upper triangularization is performed at a slow rate, any number of iterative methods can be used in the computation. The precomputation unit also takes in the received symbols and generates the continuous ML estimate. Finally, the unit can precompute some of the values that are reused for a given incoming symbol.

The second unit, the stack searcher 102, evaluates the sphere radius equation (i.e., the candidate search cost function) and generates a set of valid candidates to pass to the valid candidate queue. Each level in the tree can generate up to $Q_c$ candidates to search on the next level in the tree. Therefore, this example includes a multi-port stack architecture that can store partial searches to pursue them later after the current branch has been fully evaluated.

There are many ways to search through a binary tree. The most efficient method that retains the least intermediate information is a depth-first search. In one example, the search always proceeds to a child node in the tree and follows a path all the way to the bottom level or until the cost function exceeds the threshold. At this point, the search backs up to the next highest level with remaining nodes and proceeds again down the tree.

The depth first search requires a method of keeping track of possible nodes in the tree to revisit during the depth-first search. One example method of storing candidates is in a stack memory, where partial nodes can be placed and revisited later in the search process. The stack 114 works in a last-in first-out (LIFO) structure, and can automatically order the search into a depth-first approach. At the first level in the tree 32, the search pushes all of the valid nodes onto the stack 114. It then retrieves the last one and continues to search that node at the next level. In order for the search to operate autonomously, it must be able to retrieve all the information relevant to current search nodes (such as the cumulative cost metric as well as all the candidate symbols used to reach that level of the tree).

The stack searcher works on a tree section at level i, with a single parent node and $P_c$ child nodes, representing the $P_c$ constellation symbols at transmit antenna i.

FIG. 4 shows an example memory architecture of the stack 114. The exemplary stack searcher stores three pieces of information onto the stack 114: the current level in the tree 120, the candidates for each previous antenna used to reach this level in the tree 122, and the cumulative $T_{outer}$ sum 124. With these three pieces of information, the searcher 110 can restart a search on the remaining candidates. Because all of the associated information to deal with a tree level is pushed onto the stack, a single searcher 110 can process tree searches from different symbols quite easily, thereby allowing multiple searchers to share the peak load. The maximum depth of the stack is the product of the number of transmit antennas minus one, times the number of constellation points per symbol. In practice, with the radius condition set properly, the stack would never come close to this limit.

A real system may require multiple parallel search engines in order to handle the rates at which incoming symbols are received. FIG. 3 includes multiple searcher units 102. For example, if a search of the entire tree requires 300 clock cycles for a single received vector, and a new received vector is received every 50 clock cycles, the architecture will require six parallel searchers 102. Because all of the associated information to deal with a tree level is pushed onto the stack, it is simple to share the peak search load between multiple search units, by simply passing the stack output along with the continuous ML estimate onto another searcher. If a stack search unit finishes its particular search early, then it can be used as a resource to help complete the search for another searcher.

To initialize the search, the root node is pushed into the stack with a zero cumulative cost metric.

FIG. 5 schematically shows the architecture of one selected example searcher datapath. The example architecture includes a pipeline 130 that retrieves the value from the stack 114, takes the $T_{inner}$ product (which is based on only the candidates used to reach this particular node of the tree) from 132, adds the additional contribution of each of the candidate constellations points for the current level and then calculates the $T_{outer}$ values.

Each of the candidate $T_{outer}$ values is compared with the radius at 134 to determine if they are still valid candidates. Because the architecture only processes one search node at a time, if there is more than one valid result, the remaining candidates are pushed onto the stack 114. One of the valid candidates is passed back to the beginning of the pipeline to continue that particular branch search.

Once the searcher hits a node with no valid candidates, it retrieves a partial search node from the stack and begins processing that branch. When the candidate search can reach the bottom node of the search tree (i.e., level i=0 in FIG. 2), it passes that candidate list onto the valid candidate queue. The search continues to evaluate the candidates until it exhausts the search tree, or hits the search candidate limit dictated by the throughput requirements.

The searcher architecture in this example can generate up to $Q_c$ valid candidates (16 for a 16QAM modulation format), but the average number of valid candidates is much lower. In order to keep the pipeline running every clock cycle the stack would have to be a ($P_c$–1)-port write memory (one result is always fed back to the beginning of the pipeline). A 15-port memory is extremely expensive to implement. The actual number of valid search candidates generated is a dynamic behavior of the algorithm, but with proper selection of the sphere radius, the average number is much less than $P_c$.

In order to build an efficient hardware architecture, one solution is to build a stack that uses fewer than PC ports. The schematic in FIG. 5 shows the searcher generating up to X valid candidates and passing them into a Y port stack memory. When the value of X is less than or equal to Y, the stack can store all of the products in a single clock cycle. If X is greater than Y, the stack must stall the pipeline and use multiple clock cycles to store all of the candidates. If Y is selected to cover the majority of cases, then the architecture can run in a single clock cycle without having to implement the full 15-port write memory in the case of 16QAM. For instance, simulations have shown that on average only 3-4 valid candidates survive each search step in the tree search.

Therefore, a 4-port stack can handle 5 valid candidates (i.e., Y=4, X=5) and still keep the architecture running every cycle. In the few occasions where more than 4 valid candidates are generated, the searcher temporary stalls the pipeline.

Referring again to the determination of the triangular matrix representation of the channel matrix, linear pre-processing is required to provide the triangular matrix. In one example, U preferably is determined by avoiding the square-root and division operations normally required in a Cholesky or QR. In one example, the inventive approach includes reformulating the decompositions based upon decoupling the numerator and denominator calculations. In addition, scaling by powers of 2 (corresponding to a bitshift operation) retains stability in the recursions.

Using a spherical decoder for detection in a MIMO system, the Cholesky or QR factorization must be determined each time the channel matrix H is updated. For ease of notation, we define the M×M matrix $A=H^H H$. Cholesky factorization traditionally involves division and square-root operations. In fixed-point VLSI implementations, the division and square-root operations are best avoided.

The QR decomposition is closely related to the Cholesky decomposition and offers an alternative means to calculate the desired upper triangular matrix U. The QR decomposition of the matrix H is $$H=Q^H R \quad (5)$$

where R is upper triangular and of the same dimension as H (i.e. N×M) and Q is orthogonal N×N matrix, i.e.

$Q^H Q = QQ^H = I$. The matrix R, although different in dimension to U, contains the same non-zero entries for ij=1, . . . min(N, M).

Figure 6:
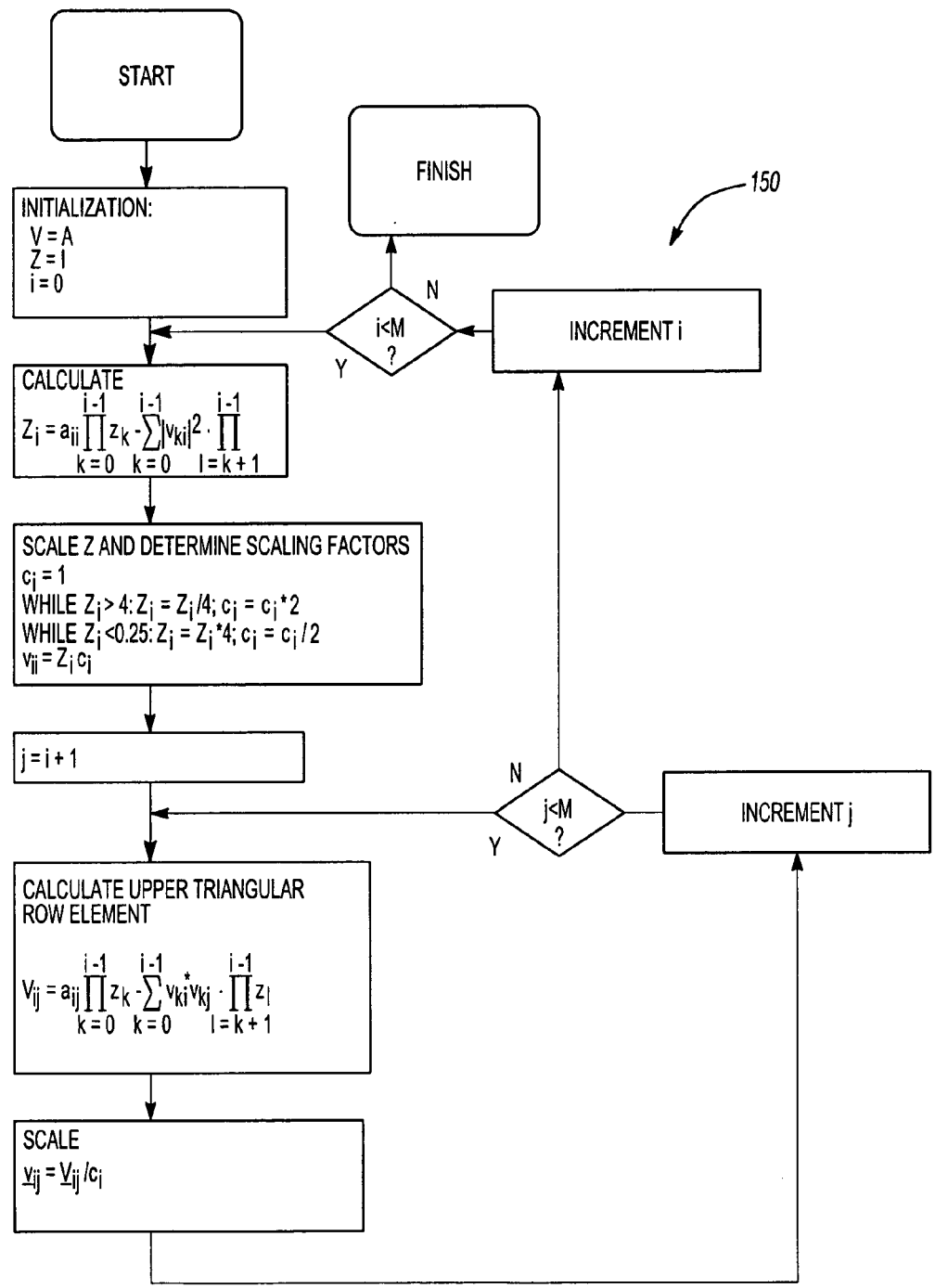
FIG. 6 is a flowchart diagram summarizing an example Cholesky decomposition technique.

In order to avoid the square-root and division operations in a VLSI implementation, one implementation of the novel Cholesky decomposition technique, which is summarized in the flow chart 150 of FIG. 6, includes first decoupling the numerator and denominator of the elements of U, i.e. $\underline{u}_{ij}=\underline{v}_{ij}/\text{sqrt}(w_i)$. For the first row (i=0), we have $u_{00}=\text{sqrt}(a_{00})=a_{00}/\text{sqrt}(a_{00})$, and $\underline{u}_{0j}=\underline{a}_{0j}/\text{sqrt}(a_{00})$, and so we have $w_0=a_{00}$, and $\underline{v}_{0j}=\underline{a}_{0j}$. Note that since A is symmetric, its diagonal elements are real, and so the denominator $w_0$ is also real. For the second row (i=1), we have $u_{11}=\text{sqrt}(a_{11}-|\underline{u}_{01}|^2)=\text{sqrt}(a_{11}-|\underline{a}_{10}|^2/a_{00})$. Moving the square-root operations to the denominator results in $u_{11}=(a_{11}-|\underline{a}_{10}|^2/a_{00})/(\text{sqrt}(a_{11}a_{00}-|\underline{a}_{10}|^2)*\text{sqrt}(a_{00}))$. Completing the row, yields the conclusion that $w_1=(a_{11}a_{00}-|\underline{a}_{10}|^2)w_0$, and $\underline{v}_{1j}=\underline{a}_{1j}a_{00}-\underline{a}^*_{10}\underline{a}_{0j}$ for j=2, . . . , M−1.

In the latter, we have recognized the symmetry of A, and from this we note that we can reuse the storage space for A by overwriting the upper triangular elements with the exception of the diagonal elements, which must be stored separately.

Following this pattern for each row, we recognize that we can represent the elements of U by $\underline{u}_{ij}=\underline{v}_{ij}/\text{sqrt}(w_i)$ where $w_i = z_0^* \ldots *z_i$ where $z_i$ are always real, $z_0=a_{00}$, $z_1=(a_{11}a_{00}-|a_{10}|^2)$, and so on. The recursions are then modified to directly calculate $\underline{v}_{ij}$ and $z_i$ for each row. In fact this results in an alternative decoupled factorization:

$$V^H W V = H^H H \qquad (6)$$

where V is upper triangular matrix and W is a diagonal matrix of real valued weights $1/w_i$.

The division and square-root operations of the traditional Cholesky factorization have been eliminated from the recursions by separating the numerator and denominator, and with this construction of the algorithm, these operations may be postponed until the actual value of $\underline{u}_{ij}$ is required in further calculation. However, as a consequence, the results of the recursions are numerically unlimited which (depending on the matrix H) may pose a problem in fixed-point implementations. Fortunately, this problem is easily avoided by scaling.

Scaling may be achieved during each row operation by dividing (or multiplying) only by powers of 2 (i.e. a shift operation in binary fixed-point implementation). Basically, the aim is to keep the factors $z_i$ between 0.25 and 4, and scale the elements $\underline{v}_{ij}$ accordingly. Thus we end up with $v_{ii}=z_i c_i$, where $c_i$ is a power of 2 (may be less than, equal to, or greater than 1).

The complexity of the new scaled and decoupled Cholesky factorization is $O(M^3/6)$ complex multiplications and subtractions and an additional $O(M^3/6)$ real multiplications resulting from the separation of numerator and denominator recursions. There are no division or square-root operations during the factorization.

Figure 7:
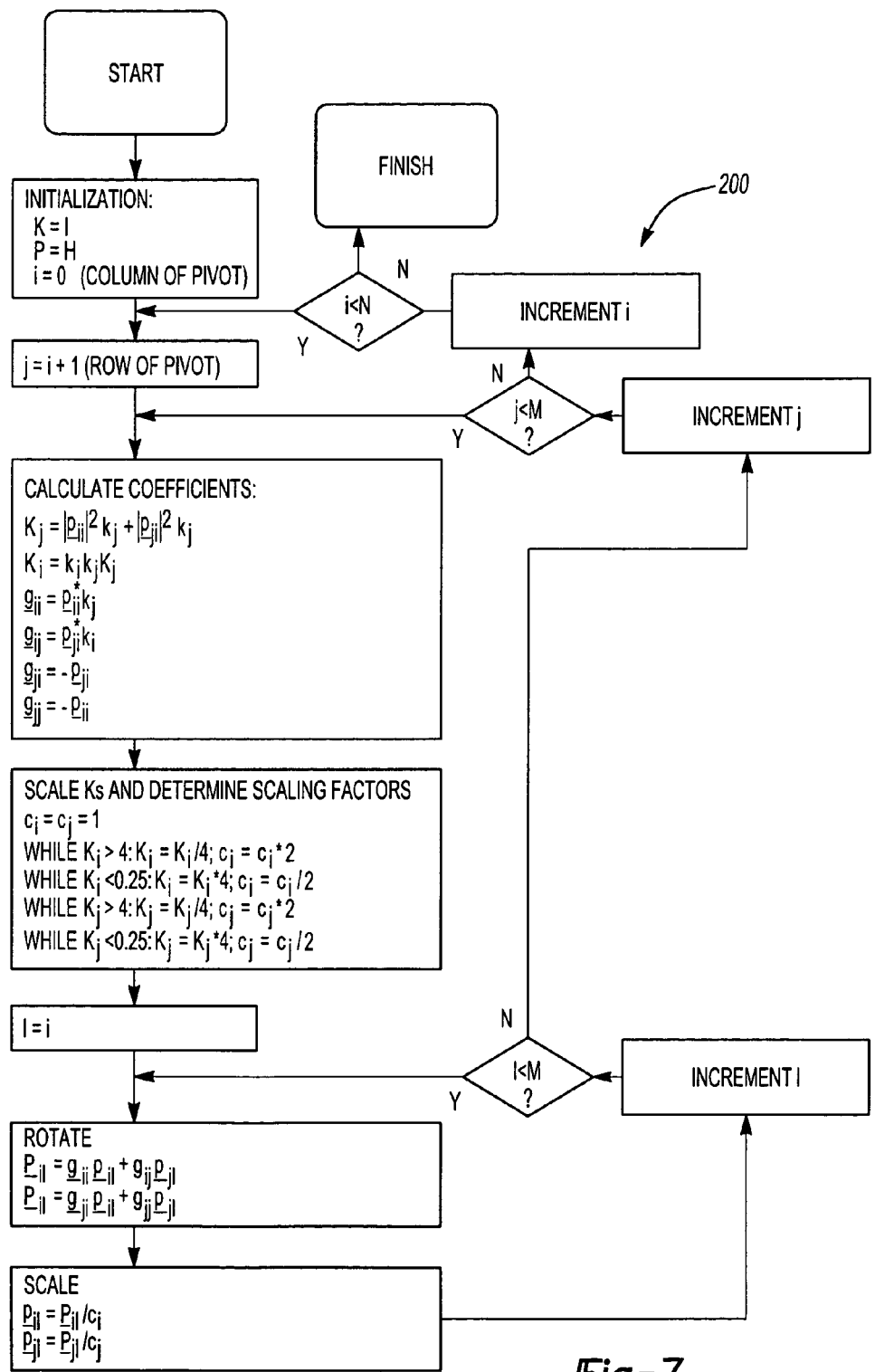
FIG. 7 is a flowchart diagram summarizing an example QR decomposition.

In another example implementation of this invention, which is summarized in the flow chart 200 of FIG. 7, a QR decomposition is derived which avoids square-root and division operations by representing $\underline{r}_{ij}=\underline{p}_{ij}/\text{sqrt}(k_i)$. This corresponds to the decomposition $$H = \Phi^H K^{-1} P \qquad (7)$$

where the elements of $K^{-1}$ (an N×N diagonal and real matrix) are given by $1/k_i$. The upper triangular matrix P is achieved by applying scaled Givens rotations to the complex N×M matrix H.

The algorithm is initialized with $\underline{p}_{ij}=\underline{h}_{ij}$, and $k_i=1$ for i=0, . . . N−1, j=0, . . . , M−1. In eliminating (rotating to zero) element $\underline{p}_{ji}$ (for j>i), the rotation is defined by $$\begin{bmatrix} \underline{P}_{ii} \\ 0 \end{bmatrix} = \begin{bmatrix} p_{ii}^* k_j & p_{ji}^* k_i \\ -\underline{p}_{ji} & \underline{p}_{ii} \end{bmatrix} \begin{bmatrix} \underline{p}_{ii} \\ \underline{p}_{ji} \end{bmatrix}$$

where $\underline{P}_{ij}$ denotes the updated element. In addition to performing the rotations, the real-valued weights, $k_i$, must be updated. Thus the scaled Givens rotation based on element $\underline{p}_{ji}$ may be summarized as $$\underline{P}_{il} = \underline{p}_{ii}^* k_j \underline{p}_{il} + \underline{p}_{ji}^* k_i \underline{p}_{jl} \quad \text{for } l=i, \ldots, M-$$

$$\underline{P}_{jl} = -\underline{p}_{ji} \underline{p}_{il} + \underline{p}_{ii} \underline{p}_{jl} \quad \text{for } l=i, \ldots, M-1$$

$$K_j = \underline{p}_{ii}$$

$$K_i = k_i k_j \underline{p}_{ii}$$

where $K_i$ denotes the updated $k_i$, and $(.)^*$ denotes a complex conjugate.

To retain numerical stability, we superimpose the same scaling mechanism, this time using factors $k_i$ and $k_j$. Basically, the aim is to keep the factors $k_i$ and $k_j$ between 0.25 and 4, and scale the elements $\underline{p}_{ij}$ accordingly. Scaling is performed for each rotation and involves only binary shift operations (i.e. scaling by a power of 2). Furthermore, the scaling ensures that the variables $k_i$ are of similar magnitude for i=0, . . . N−1.

This alternative formulation once again provides the advantage of recursions without division and square-root operations. These operations may be deferred until there is a need to make use of the true decomposition Q and R.

For comparative purposes, we consider the complexity of calculating only K and P. The complexity is dominated by the rotations which require $O(2M^2N-5M^3/3)$ complex multiplications (and half as many complex additions) for M≦N. For M≈N (or in the case that only M rows are required) this becomes $O(M^3/3)$.

In one example using the approach described above to obtain U=qr(H), then the impact on the spherical detector amounts to altering the inequality (2) to be $$\sum_{i=0}^{M-1} \kappa_i \left| \underline{p}_{ii}(s_i - \hat{s}_i) + \sum_{j=i+1}^{M-1} \underline{p}_{ij}(s_j - \hat{s}_j) \right|^2 \leq \kappa_0 r^2 \qquad (8)$$

where $\kappa_i = \Pi_{j,j\neq i} k_j$ and $\kappa_0 = \Pi_j k_j$. Note that the rotation matrix $\Phi$ is not required by the spherical decoder. Although the impact on the spherical decoder is analogous, the scaled QR method has an advantage over the scaled Cholesky method in that the $\kappa_i$s are of the same order of magnitude (since $k_i$s are constructed to be the same order of magnitude), where as the $w_i$s may grow with i.

In one example, the upper triangular matrix U is used in formulating the cost function for the MLAPP so that it can computed with a summation over each transmit antenna candidate, and each term is guaranteed to be a positive definite function.

The next step, once U is determined, is to determine the spherical decoder candidate search center point. This is the continuous ML estimate of the transmit candidate, and it is not constrained to the valid symbols constellations points. The search in the MLAPP and spherical algorithm further refines the candidate to the best set of constellation points for each symbol. The search center, or unconstrained ML estimate, in this example is described by the equation:

$$\hat{s} = \arg\min \|\hat{H}s - y\|^2 \quad (9)$$

which can be rewritten as:

$$\hat{s} = By \text{ where } B = (H^H H)^{-1} H^H \quad (10)$$

In one example, the M×N matrix, B, is precomputed at the same time that U is calculated as they share similar operations. Once that value has been precomputed, the search center point calculation only requires an M×N matrix multiplied by the N×1 received symbol vector for each received set of symbols.

While the matrix U only needs to be calculated for each new channel estimate, the search center point ŝ must be calculated for each received vector, y. We may also require this computation for determining the search radius, r. Ideally, the computation avoids the divisions involved in inverting the matrix $A = H^H H$.

One example implementation of this invention includes using back-substitution to determine ŝ using the scaled and decoupled QR decomposition solution. Back-substitution is a known method for obtaining the solution to a set of linear equations for which a triangular decomposition is available. In this example, back-substitution does not require the rotation matrix Φ, but only the upper triangular matrix P and the scaling factors from the matrix K are needed. Although divisions are required to obtain the solution, there are only M divisors, which may be calculated once for each new decomposition corresponding to a new channel matrix H. These divisors may be used for many received vectors y.

ŝ is obtained by solving the equations $A\hat{s} = H^H y$. This equation is transformed to $P^H K^{-1} P\hat{s} = H^H y$, since $A = H^H H = U^H U = V^H W V = P^H K^{-1} P$. Thus the system of linear equations can be solved in two parts exploiting the triangularity of P:

$$P^H x = H^H y \quad (11)$$

$$P\hat{s} = Kx \quad (12)$$

In each case only divisions by the diagonal elements of P are needed, and these may be calculated prior to back-substitution so that only additions and multiplications are required during the back-substitution procedure.

Accordingly, this invention provides a strategy for detecting coded transmissions that contain combinations of symbols taken from a large number of available combinations. The spherical decoder candidate search quickly reduces the number of candidate combinations to be processed using a selected decoding technique without considering each of the available combinations, directly. The inventive approach facilitates handling relatively complex transmissions in an efficient and effective manner.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A spherical decoder device, comprising:
   a receiver for receiving signals having a plurality of available symbol combinations; and
   a decoder for determining an incremental cost of candidates within a portion of the available combinations, the decoder comprising a plurality of search units, each unit for determining the cumulative cost of allocated ones of the available combinations using a depth first search and wherein at least a portion of an output of at least one of the search units selectively passes to another one of the search units.

2. The device of claim 1, wherein the decoder comprises a precomputation unit for determining a triangular representation of a channel matrix of a received transmission, the precomputation unit for separating out a numerator portion and a denominator portion of the triangular matrix representation.

3. The device of claim 2, wherein the precomputation unit uses the equation $V^H W V = H^H H$, where V is a triangular matrix and W is a diagonal matrix of real valued weights $1/w_i$.

4. The device of claim 2, wherein the precomputation unit uses the equation $H = \Phi^H K^{-1} P$ where H is the complex N×M channel matrix, $K^{-1}$ is an N×N diagonal and real matrix having elements $1/k_i$, and P is a triangular matrix achieved by applying scaled Givens rotations to H.

5. The device of claim 1, wherein the search unit comprises a stack memory for at least temporarily storing a cumulative cost of each considered candidate with information regarding a location of each considered candidate within a tree structure containing all of the available candidates.

6. The device of claim 5, wherein the search unit places a candidate at one tree level into the stack memory if the candidate has a cost within a selected radius.

7. The device of claim 1, wherein the portion of the output of the one search unit is passed to the other search unit if the other search unit completes determining the cost of its allocated combinations if the one search unit is still determining the cost of its allocated combinations.

8. The device of claim 1, wherein the search unit generates an average of X valid candidates within a search cycle and including a stack memory having Y ports, where Y is less than the maximum number of available candidates and has a selected relationship to X.

9. The device of claim 8, wherein Y is greater than or equal to X and the search unit passes each valid candidate to one of the Y ports during the cycle.

10. The device of claim 8, wherein Y is less than X and the search unit passes each valid candidate to one of the Y ports over more than one of the cycles.

11. A spherical decoder device, comprising:
    a receiver for receiving signals having a plurality of available symbol combinations; and
    a decoder for determining an incremental cross of candidates within a portion of the available combinations, the decoder comprising a precomputation unit for determining a triangular representation of a channel matrix of a received transmission, the precomputation unit separating out a numerator portion and a denominator portion of the triangular matrix representation, wherein the precomputation unit uses the equation $V^H W V = H^H H$, where V is a triangular matrix and W is a diagonal matrix of real valued weights $1/w_i$.

12. A spherical decoder device, comprising:
    a receiver for receiving signals having a plurality of available symbol combinations; and
    a decoder for determining an incremental cost of candidates within a portion of the available combinations, the decoder comprising a precomputation unit for determining a triangular representation of a channel matrix of a received transmission, the precomputation unit separating out a numerator portion and a denominator portion of the triangular matrix representation, wherein the precomputation unit uses the equation $H=\Phi^{H}K^{-1}P$ where H is the complex N×M channel matrix, $K^{-1}$ is an N×N diagonal and real matrix having elements $1/k_i$, and P is a triangular matrix achieved by applying scaled Givens rotations to H.

13. A spherical coder device, comprising:
a receiver for receiving signals having a plurality of available symbol combinations; and
a decoder for determining an incremental cost of candidates within a portion of the available combinations, the decoder comprising a search unit for determining the cumulative cost of the portion of the available combinations using a depth first search, the search unit generating an average of X valid candidates within a search cycle and including a stack memory having Y ports, where Y is less than the maximum number of available candidates and has a selected relationship to X.

14. The device of claim 13, wherein Y is greater than or equal to X and the search unit passes each valid candidate to one of the Y ports during the search cycle.

15. The device of claim 13, wherein Y is less than X and the search unit passes each valid candidate to one of the Y ports over more than one search cycle.

* * * * *